(12) United States Patent
Fukatani et al.

(10) Patent No.: US 8,784,992 B2
(45) Date of Patent: Jul. 22, 2014

(54) INTERLAYER FILM FOR LAMINATED GLASS AND LAMINATED GLASS

(71) Applicant: Sekisui Chemical Co., Ltd., Osaka (JP)

(72) Inventors: Juichi Fukatani, Koka (JP); Bungo Hatta, Koka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 13/930,873

(22) Filed: Jun. 28, 2013

(65) Prior Publication Data

US 2013/0295393 A1    Nov. 7, 2013

Related U.S. Application Data

(62) Division of application No. 12/605,105, filed on Oct. 23, 2009, which is a division of application No. 10/571,055, filed as application No. PCT/JP2005/012510 on Jul. 6, 2005, now Pat. No. 7,625,634.

(30) Foreign Application Priority Data

| Jul. 6, 2004 | (JP) | .................................. | 2004-199639 |
| Jul. 6, 2004 | (JP) | .................................. | 2004-199640 |
| Feb. 28, 2005 | (JP) | .................................. | 2005-054703 |

(51) Int. Cl.
  *B32B 17/10* (2006.01)
(52) U.S. Cl.
  USPC ............................ 428/436; 428/437; 428/524
(58) Field of Classification Search
  USPC .......................................... 428/436, 437, 524
  See application file for complete search history.

(56) References Cited

U.S. PATENT DOCUMENTS

| 2,268,266 A | 12/1941 | Ryan |
| 2,726,961 A | 12/1955 | Iler |
| 3,841,890 A | 10/1974 | Coaker et al. |
| 4,027,069 A | 5/1977 | Mont et al. |
| 4,681,810 A | 7/1987 | Gomez |
| 4,956,227 A | 9/1990 | Hirayama et al. |
| 5,496,618 A | 3/1996 | Kurihara et al. |
| 5,830,568 A | 11/1998 | Kondo |
| 6,673,456 B1 | 1/2004 | Kobata et al. |
| 6,686,032 B1 | 2/2004 | Nagai |
| 7,238,427 B2 | 7/2007 | Ma |
| 2004/0234778 A1 | 11/2004 | Fukatani et al. |

FOREIGN PATENT DOCUMENTS

| EP | 1227070 A1 | 7/2002 |
| JP | 04261842 A | 9/1992 |
| JP | 08-259279 A | 10/1996 |
| JP | 09-11412 | 1/1997 |
| JP | 10-297945 A | 11/1998 |

(Continued)

OTHER PUBLICATIONS

Office Action on a counterpart RU Application No. 2007104338, received on Jun. 12, 2009 with its English Translation.

(Continued)

*Primary Examiner* — Dhirajlal S Nakarani
(74) *Attorney, Agent, or Firm* — Novak Druce Connolly Bove + Quigg LLP

(57) ABSTRACT

An interlayer film for a laminated glass and a laminated glass, which do not cause an increase in a haze value due to moisture absorption and have excellent moisture resistance are provided. An interlayer film for a laminated glass which contains a polyvinyl acetal resin and a moisture resistance improver is provided.

20 Claims, 1 Drawing Sheet

(56) References Cited

FOREIGN PATENT DOCUMENTS

| JP | 2-999177 | 12/1999 |
| JP | 11-343152 A | 12/1999 |
| JP | 2002-326846 A | 11/2002 |
| JP | 2003-261361 A | 9/2003 |
| JP | 2005-187226 A | 7/2005 |
| WO | WO-01/19748 | 3/2001 |
| WO | WO-01/19748 A1 | 3/2001 |
| WO | WO-03/018502 | 3/2003 |
| WO | WO-03/018502 A1 | 3/2003 |
| WO | WO-2005/061405 A1 | 7/2005 |

OTHER PUBLICATIONS

Office Action on a counterpart EP Application No. 05765524.3, received on Nov. 2, 2009.

(a)

(b)

(a)

(b)

INTERLAYER FILM FOR LAMINATED GLASS AND LAMINATED GLASS

TECHNICAL FIELD

The present invention relates to an interlayer film for a laminated glass and a laminated glass, which do not cause an increase in a haze value due to moisture absorption and have excellent moisture resistance.

BACKGROUND ART

Hitherto, laminated glasses are widely employed in the windowpanes of vehicles such as automobiles, aircrafts, buildings and the like since less fragments of broken laminated glasses shatter and laminated glasses are safe even though the laminated glass is subjected to an external impact to break. As such a laminated glass, there is given a laminated glass obtained by interposing an interlayer film for a laminated glass comprising, for example, a polyvinyl acetal resin such as a polyvinyl butyral resin plasticized with a plasticizer between at least a pair of glasses and unifying them.

An interlayer film for a laminated glass used for such laminated glasses contains an adhesion adjuster in order to adjust the adhesion between a glass sheet and an interlayer film for a laminated glass. An adhesion adjuster generally used was carbonate including alkali metal or alkaline earth metal.

However, there was a problem that the interlayer film for a laminated glass caused a whitening phenomenon and increased in a haze value when it absorbed moisture. In order to inhibit the whitening phenomenon due to the moisture absorption of the interlayer film for a laminated glass, there is disclosed, for example, a method of controlling the concentration of an alkali metal ion contained in the interlayer film for a laminated glass to below a certain value in Patent Document No. 1. Thereby, there is attained an interlayer film for a laminated glass which hardly whitens due to the moisture absorption.

However, in a side glass or an open edge type windshield and the like, in which an end of the laminated glass is exposed to atmosphere, since the interlayer film for a laminated glass tends to whiten from the periphery, an interlayer film for a laminated glass which does not cause whitening due to the moisture absorption even in more tough environment has been desired.

Patent Document No. 1: Japanese Patent No. 2999177

DISCLOSURE OF THE INVENTION

Problems which the Invention is to Solve

In view of the above-mentioned state of the art, the present invention aims to provide an interlayer film for a laminated glass and a laminated glass, which do not cause an increase in a haze value due to moisture absorption and have excellent moisture resistance.

Means for Solving the Object

The present invention is directed to an interlayer film for a laminated glass which comprises a polyvinyl acetal resin and a moisture resistance improver.

Hereinafter, the present invention will be described in detail.

In an interlayer film for a laminated glass, water content can assume two forms. Namely, one of the two forms is a water content, referred to as adsorbed water, which is contained in the form of being adsorbed on functional groups of resin components or additives contained in the interlayer film for a laminated glass, and the other form is a water content, referred to as "bulk water", which is not adsorbed on these components and exists solely in the interlayer film for a laminated glass. If the content of the "bulk water" increases due to the moisture absorption of the interlayer film for a laminated glass, particles of "bulk water" are flocculated and its particle diameter becomes large, and this causes visible light to scatter and this scattering may manifest itself in the form of an increase in a haze value. And, foaming and the like may occur a "bulk water" particle as a nuclear.

On the basis of results of intensive investigations, the present inventors have found that by mixing a specific compound, an interlayer film for heat ray shielding laminated glass which has extremely excellent moisture resistance and does not cause an increase in a haze value due to moisture absorption can be obtained. These findings have led to completion of the present invention.

The interlayer film for a laminated glass of the present invention contains a polyvinyl acetal resin and a moisture resistance improver.

The above-mentioned polyvinyl acetal resin plays a basic role as an interlayer film for a laminated glass.

The above-mentioned polyvinyl acetal resin is not particularly limited and a resin used previously as a resin for an interlayer film for a laminated glass can be used, and for example, resins having an acetalization degree of 60 to 75 mol % and a degree of polymerization of 800 to 3000 are suitably used. When the degree of polymerization is less than 800, the strength of a resin film become too low and therefore the penetration resistance of a laminated glass to be obtained may be deteriorated, and when the degree of polymerization is more than 3000, the moldability of the resin film becomes low or the strength of the resin film become too high and therefore the impact absorbing property of a laminated glass to be obtained may be deteriorated. Among others, a polyvinyl butyral resin is suitable from the viewpoint of having proper adhesion to glass, excellent transparency and excellent weather resistance.

The above-mentioned polyvinyl acetal resin can be obtained by acetalizing polyvinyl alcohol with aldehyde. The above-mentioned polyvinyl alcohol can be normally obtained by saponifying polyvinyl acetate, and polyvinyl alcohol having a saponification degree of 80 to 99.8 mol % is generally used.

The above-mentioned polyvinyl alcohol resin preferably has a viscosity average degree of polymerization of 200 to 3000. When the above-mentioned average degree of polymerization is less than 200, the penetration resistance of the laminated glass to be obtained may be deteriorated, and when the average degree of polymerization is more than 3000, the moldability of the resin film may be deteriorated, the rigidity of the resin film become too high and therefore the processability may be deteriorated. The average degree of polymerization is more preferably 500 to 2000. Incidentally, the viscosity average degree of polymerization and the saponification degree of a polyvinyl alcohol resin can be measured according to, for example, JIS K 6726 "Testing methods for polyvinyl alcohol".

The above-mentioned aldehyde is not particularly limited, aldehydes having 1 to 10 carbon atoms are generally employed and for example, n-butyl aldehyde, iso-butyl aldehyde, n-valeraldehyde, 2-ethylbutyl aldehyde, n-hexyl aldehyde, n-octyl aldehyde, n-nonyl aldehyde, n-decyl aldehyde, formaldehyde, acetaldehyde, benzaldehyde and the like are given. Among others, n-butyl aldehyde, n-hexyl aldehyde and n-valeraldehyde are suitably used. Butyl aldehyde having 4 carbon atoms is particularly preferably used.

In the present description, a moisture resistance improver refers to an agent which enhances the moisture resistance of the interlayer film for a laminated glass by being mixed.

The above-mentioned moisture resistance improver is not particularly limited, but an amphiphilic material and/or a surfactant is suitable for the moisture resistance improver. The amphiphilic material and/or the surfactant also has an effect as a dispersant for a heat ray shielding fine particle described later.

The above-mentioned amphiphilic material refers to a compound having both of hydrophilic groups such as carboxyl group, sulfonium group, aldehyde group, keto group, ammonium group and hydroxy group, and hydrophobic groups such as hydrocarbon. Specifically, there are given monoalcohols such as ethanol and propanol; polyhydric alcohols starting with dihydric alcohol such as ethylene glycol; alicyclic alcohols such as cyclohexanol; aromatic alcohols such as benzyl alcohol; alcohol derivatives such as hydroxy aldehyde, hydroxy ketone, hydroxy acid, sterol and terpenes; monocarboxylic acids such as acetic acid and stearic acid; polyfunctional carboxylic acids starting with dicarboxylic acids such as oxalic acid; aromatic carboxylic acids such as benzoic acid; unsaturated carboxylic acids such as acrylic acid; carboxylic acid derivatives such as an acyl compound, acid amide, acid azide, acid chloride, acid anhydride and nitrile; and carboxylic acids having a functional group other than carboxyl group such as hydroxy acid, keto acid, aldehyde acid, phenolic acid, amino acid and halogen carboxylic acid.

The above-mentioned surfactant is not particularly limited and includes compounds generally used as a dispersant, an emulsifier, an antifoaming agent, a lubricant, a penetrant, a cleaning agent, a builder, a hydrophobicity agent, a water repellent, a surface adjuster and a viscosity adjuster, and for example, nonionic, cationic, amphoteric and anionic surfactants may be used.

As the nonionic surfactant, there are given polyoxyalkylene alkyl ethers such as polyoxyethylene lauryl ether; polyoxyalkylene alkyl ethers or polyoxyethylene derivatives such as polyoxyethylene alkylenealkyl ether, polyoxyethylene distyrenated phenyl ether and polyoxyethylene polyoxypropylene glycol; sorbitan fatty acid esters such as sorbitan monolaurate; polyoxyalkylene sorbitan fatty acid esters such as polyoxyethylene sorbitan monolaurate; polyoxyalkylene sorbitol fatty acid esters such as polyoxyethylene sorbit tetraoleate; glycerin fatty acid esters such as glycerol monostearate; polyoxyalkylene fatty acid esters such as polyethyleneglycol monolaurate; polyoxyalkylene hydrogenated castor oil such as polyoxyethylene hydrogenated castor oil; polyoxyethylene alkylamine and alkyl alkanolamide.

As the cationic surfactant, there are given, for example, alkyl amine salt such as coconut amine acetate and quaternary ammonium salt such as lauryltrimethylammonium chloride, and the like.

As the amphoteric surfactant, there are given, for example, alkyl betaine such as lauryl betaine, and alkyl amine oxide such as lauryl dimethyl amine oxide, and the like.

As the anionic surfactant, there are given, for example, alkyl sulfate ester salt such as sodium lauryl sulfate, poly(cxyalkylene)alkyl ether sulfate ester salt such as poly(oxyethylene)lauryl ether sodium sulfate, alkyl benzene sulfonate such as dodecylbenzene sulphonate, potassium salt such as fatty acid soap, poly(oxyethylene)alkyl ether potassium phosphate and dipotassium alkenyl succinate, sodium salt such as sodium alkanesulfonate; poly(oxyalkylene)alkyl phenyl ether phosphate esters such as poly(oxyethylene)octylphenyl ether phosphate ester, poly(oxyethylene)nonylphenyl ether phosphate ester and poly(oxyethylene)laurylphenyl ether phosphate ester; and phosphate esters such as trimethyl phosphate, triethyl phosphate, tributyl phosphate, tris(2-chloroethyl) phosphate, triphenyl phosphate, tricresylphosphate, cresyl.diphenylphosphate, di-2-ethylhexyl phosphate, methyl acid phosphate, ethyl acid phosphate, propyl acid phosphate, isopropyl acid phosphate, butyl acid phosphate, lauryl acid phosphate, stearyl acid phosphate, 2-ethylhexyl acid phosphate, isodecyl acid phosphate, phenylphosphonic acid, poly(oxyethylene)octylphenyl ether phosphate ester, poly(oxyethylene)nonylphenyl ether phosphate ester and poly(oxyethylene)laurylphenyl ether phosphate ester.

As the above-mentioned moisture resistance improver, there is particularly preferably used an improver having a solubility parameter which is larger than polyvinyl acetal resin and a plasticizer described later and smaller than water. Among others, the moisture resistance improver having a solubility parameter in the range of 10.0 to 20.0 $(cal/cm^3)^{1/2}$ is suitable.

The solubility parameter in the present invention is determined by a method proposed by Small and can be derived from the following equation (1).

[Equation 1]

$$\text{Solubility parameter} = \rho(\Sigma Fi/M) \quad (1)$$

ρ: density

Fi: molar attractive forces of constituent groups such as an atom or an atomic group, bond type, etc., which compose a molecule. Values described in P. A. Small, J. Appl. Chem., 3, 71 (1953) can be employed.

M: molecular weight

When the solubility parameter is less than 10.0 $(cal/cm^3)^{1/2}$, since a power adsorbing on water content is too small, it is impossible to inhibit the occurrence of flocculated bulk water resulting in an increase in a haze value, and when it is more than 20.0 $(cal/cm^3)^{1/2}$, a phase separation may occur because of a low affinity for the polyvinyl acetal resin or the plasticizer. More preferably, a lower limit of the solubility parameter is 12.0 $(cal/cm^3)^{1/2}$ and an upper limit is 15.0 $(cal/cm^3)^{1/2}$.

And, when measurement of the solubility parameter is difficult, the above-mentioned moisture resistance improver may be judged by a relative permittivity. That is, as the above-mentioned moisture resistance improver, an improver having a relative permittivity in the range of 20 to 35 at 25° C. is suitable. When the relative permittivity is less than 20, it is impossible to inhibit the occurrence of flocculated bulk water resulting in an increase in a haze value, and when it is more than 35, a phase separation may occur because of a low affinity for the polyvinyl acetal resin or the plasticizer. More preferably, a lower limit of the relative permittivity is 22 and an upper limit is 25.

Incidentally, the values of the relative permittivity can be referred to the table described in "TECHNIQUE OF ORGANIC CHEMISTRY, Volume VII. SECOND EDITION. INTERSCIENCE PUBLISHING, INC. p 43-p 258".

As a moisture resistance improver having such a solubility parameter or relative permittivity, there are given, for example, a phosphate ester type compound and lower alcohols such as ethanol, and the like. Among others, the phosphate ester type compound is particularly suitable.

The content of the above-mentioned moisture resistance improver preferably has a lower limit of 0.005 parts by weight and an upper limit of 20 parts by weight with respect to 100 parts by weight of a polyvinyl acetal resin. When the content is less than 0.005 parts by weight, an adequate effect of improving the moisture resistance may be not obtained, and when it is more than 20 parts by weight, the interlayer film for a laminated glass generates foam in forming the interlayer film for a laminated glass, or the interlayer film for a laminated glass generates foam or the adhesion between the interlayer film for a laminated glass and the glass may increase too much when forming the laminated glass. More preferably, a lower limit of the content is 0.01 parts by weight and an upper limit is 5 parts by weight.

The interlayer film for a laminated glass of the present invention preferably contains a chelating agent and/or a compound having at least one carboxyl group. By using in combination with the chelating agent and/or the compound having at least one carboxyl group, the moisture resistance of the interlayer film for a laminated glass of the present invention can be further improved.

The above-mentioned chelating agent is not particularly limited and includes, for example, EDTAs and β-diketones and the like. Among others, β-diketones are preferred because of good compatibility with a plasticizer and a resin, and acetyl acetone is particularly suitable. Benzoyltrifluoroacetone, dipivaloylmethane and the like may be used other than acetyl acetone.

The content of the above-mentioned chelating agent preferably has a lower limit of 0.005 parts by weight and an upper limit of 20 parts by weight with respect to 100 parts by weight of a polyvinyl acetal resin. When this content is less than 0.005 parts by weight, an adequate effect of improving the moisture resistance may be not obtained, and when it is more than 20 parts by weight, the interlayer film for a laminated glass generates foam in forming the interlayer film for a laminated glass, or the interlayer film for a laminated glass generates foam when forming the laminated glass. More preferably, a lower limit of the content is 0.01 parts by weight and an upper limit is 5 parts by weight.

The above-mentioned compound having at least one carboxyl group is not particularly limited and includes, for example, aliphatic carboxylic acid, aliphatic dicarboxylic acid, aromatic carboxylic acid, aromatic dicarboxylic acid and hydroxy acid and the like, and more specifically it includes benzoic acid, phthalic acid, salicylic acid, and ricinoleic acid and the like. Among others, aliphatic carboxylic acids having 2 to 18 carbon atoms are preferred, and aliphatic carboxylic acids having 2 to 10 carbon atoms are more preferred. Specifically, there are given, for example, acetic acid, propionic acid, n-butyric acid, 2-ethylbutyric acid, n-hexanoic acid, 2-ethyl hexanoic acid, and n-octanoic acid. Among others, 2-ethyl hexanoic acid is particularly suitable.

The content of the above-mentioned compound having at least one carboxyl group preferably has a lower limit of 0.005 parts by weight and an upper limit of 10 parts by weight with respect to 100 parts by weight of a polyvinyl acetal resin. When this content is less than 0.005 parts by weight, an adequate effect of improving the moisture resistance may be not obtained, and when it is more than 10 parts by weight, the interlayer film for a laminated glass to be obtained may causes yellowing or the adhesion between the glass and the interlayer film for a laminated glass may be impaired. More preferably, a lower limit of the content is 0.01 parts by weight and an upper limit is 5 parts by weight.

The interlayer film for a laminated glass of the present invention may further contain a plasticizer.

The above-mentioned plasticizer is not particularly limited as long as it is one generally used in a polyvinyl acetal resin. As the above-mentioned plasticizer, publicly known plasticizers which are generally used as a plasticizer for an interlayer film for a laminated glass can be used and for example, organic type plasticizers such as monobasic organic acid ester and polybasic organic acid ester; and phosphoric acid type plasticizers such as organic phosphoric acid type and organic phosphorous acid type and the like are given. These plasticizers may be used alone or may be used in combination of two or more species and are selectively used in accordance with the species of the polyvinyl acetal resin in consideration of the compatibility with resins.

The above-mentioned monobasic organic acid ester type plasticizer is not particularly limited and includes, for example, glycol type esters obtained by a reaction between glycol such as triethylene glycol, tetraethylene glycol or tripropylene glycol and monobasic organic acid such as butyric acid, isobutyric acid, caproic acid, 2-ethylbutyric acid, heptylic acid, n-octylic acid, 2-ethylhexylic acid, pelargonic acid (n-nonylic acid) or decylic acid. Among others, there are suitably used monobasic organic acid esters of triethylene glycol such as triethylene glycol-dicaproic acid ester, triethylene glycol-di-2-ethylbutyric acid ester, triethylene glycol-di-n-octyl acid ester and triethylene glycol-di-2-ethylhexylic acid ester.

The above-mentioned polybasic organic acid ester type plasticizer is not particularly limited and includes, for example, esters of polybasic organic acid such as adipic acid, sebacic acid or azelaic acid, and straight-chain or branched alcohols having 4 to 8 carbon atoms. Among others, dibutyl sebacare ester, dioctyl azelate ester, and dibutyl carbitol adipate ester are suitably used.

The above-mentioned organic phosphate type plasticizer is not particularly limited and includes, for example, tributoxyethyl phosphate, isodecylphenyl phosphate and triisopropyl phosphate and the like.

As the above-mentioned plasticizer, there are suitably used particularly triethylene glycol-di-ethylbutyrate, triethylene glycol di-ethylhexoate and triethylene glycol-di-butyl sebacate.

An amount of the above-mentioned plasticizer to be mixed is preferably 20 to 60 parts by weight with respect to 100 parts by weight of the polyvinyl acetal resin. When the amount to be mixed is less than 20 parts by weight, an impact absorbing property of an interlayer film for a laminated glass and a laminated glass to be obtained may become insufficient, and when it is more than 60 parts by weight, the plasticizer bleeds out and an optical strain of the interlayer film for a laminated glass and the laminated glass to be obtained may become large or the transparency and the adhesion between the glass and the interlayer film for a laminated glass may be impaired. The amount of the plasticizer to be mixed is more preferable 30 to 50 parts by weight.

The interlayer film for a laminated glass of the present invention preferably contains a heat ray shielding particle.

The above-mentioned heat ray shielding particle is not particularly limited, but for example, at least one kind selected from the group consisting of a tin-doped indium oxide (ITO) fine particle, an antimony-doped tin oxide (ATO) fine particle, an aluminum-doped zinc oxide (AZO) fine particle, an indium-doped zinc oxide (IZO) fine particle, a silicon-doped zinc oxide fine particle, a zinc antimonic anhydride fine particle, and a lanthanum hexaboride fine particle is suitably used.

Since these heat ray shielding particles have an excellent function of shielding infrared ray (heat ray), an interlayer film for a laminated glass and a laminated glass to be obtained develop an excellent heat ray shielding property. Further, the heat ray shielding particle also has an effect of improving the moisture resistance of the interlayer film for a laminated glass of the present invention by mixing the heat ray shielding particle in a certain amount or more.

The above-mentioned heat ray shielding fine particles preferably have an average particle diameter of 100 nm or smaller. When the average particle diameter is larger than 100 nm, scattering of visible light due to the heat ray shielding fine particle becomes remarkable and therefore the transparency of the interlayer film for a laminated glass to be obtained may be impaired. Consequently, when the laminated glass is formed from this interlayer film for a laminated glass, haze value is deteriorated and it becomes impossible to satisfy a high level of transparency required in, for example, windshields of automobiles. A more preferable average particle diameter is 10 to 80 nm.

Preferably, the above-mentioned heat ray shielding fine particles are uniformly dispersed in the interlayer film for a laminated glass. By uniformly dispersing in the interlayer film for a laminated glass, when forming the laminated glass from this interlayer film for a laminated glass, the laminated glass has low haze value and high transparency and its heat ray shielding property becomes high throughout the whole glass, and further since adhesion between the glass and the interlayer film for a laminated glass becomes controllable, penetration resistance of the laminated glass becomes excellent.

That is, in the interlayer film for a laminated glass of the present invention, the above-mentioned heat ray shielding fine particles are preferably dispersed so as to be $1/\mu m^2$ or less in the density of particles having a particle diameter of 100 nm or larger. That is, when the interlayer film for a laminated glass of the present invention is taken a photograph of and observed with a transmission electron microscope, the above-mentioned heat ray shielding fine particles are dispersed so as to be in a state that the above-mentioned heat ray shielding fine particle having a particle diameter of 100 nm or larger is not observed, or if such fine particle is observed, when this heat ray shielding fine particle having a particle diameter of 100 nm or larger is positioned at the center of a frame of 1 $\mu m^2$, another heat ray shielding fine particle having a particle diameter of 100 nm or larger is not observed in this frame of 1 $\mu m^2$. Thereby, when forming the laminated glass from this interlayer film for a laminated glass, the laminated glass has low haze value and high transparency and a high heat ray shielding property can be attained throughout the whole glass. Incidentally, observation with a transmission electron microscope can be carried out by taking a photograph at an acceleration voltage of 100 kV using a transmission electron microscope H-7100 FA manufactured by Hitachi, Ltd.

An amount of the above-mentioned heat ray shielding fine particle to be mixed preferably has a lower limit of 0.005 parts by weight and an upper limit of 3 parts by weight with respect to 100 parts by weight of a polyvinyl acetal resin. When the amount to be blended is less than 0.005 parts by weight, an adequate effect of shielding infrared ray may not be exerted and the heat ray shielding property of the interlayer film for a laminated glass and the laminated glass to be obtained may not be adequately improved, and when it is more than 3 parts by weight, the transparency of visible light of the interlayer film for a laminated glass and the laminated glass to be obtained may be deteriorated or a haze value may become larger.

The interlayer film for a laminated glass of the present invention may contain ultraviolet absorbers such as malonate ester type compounds, anilide oxalate type compounds, benzotriazole type compounds, benzophenone type compounds, triazine type compounds, benzoate type compounds and hindered amine type compounds; adhesion adjusters such as alkali metal salts or alkaline earth metal salts of an organic acid or an inorganic acid and modified silicone oil; and publicly known additives such as an anti-oxidant, a light stabilizer, a surfactant, a flame retarder, an antistatic agent, a moisture resistance agent, a heat reflector and a heat absorbing agent.

A method of producing the interlayer film for a laminated glass of the present invention is not particularly limited and includes, for example, a method in which the above-mentioned polyvinyl acetal resin, moisture resistance improver, heat ray shielding fine particle, chelating agent, compound having at least one carboxyl group, and various additives to be added as required are kneaded using an extruder, a plastograph, a kneader, a banbury mixer, calendaring rolls or the like, and the kneaded mixture is shaped into a film in sheet form by usual methods of forming a film such as extrusion, calendaring and pressing.

An interlayer film for a laminated glass, which contains at least one kind of inorganic fine particle selected from the group consisting of a silica fine particle, an aluminum oxide fine particle, and a zirconium oxide fine particle, the inorganic fine particle having a dispersion diameter of 500 nm or less, also constitutes the present invention (hereinafter, referred to as the second present invention).

The present inventors made earnest investigations, and found that an interlayer film for a laminated glass, in which the inorganic fine particles were dispersed in a fine-grained state within a certain range of a particle diameter, was less prone to being whitened due to moisture absorption. These findings have led to completion of the present invention.

The reason for this is assumed to be that the interlayer film for a laminated glass contains the above-mentioned inorganic fine particle which has a higher affinity for water than an alkali metal ion such as a sodium ion to be contained in a production process of the interlayer film for a laminated glass and thereby, a water molecule in the interlayer film for a laminated glass is flocculated selectively around the above-mentioned inorganic fine particle as a nuclear instead of the alkali metal ion such as a sodium ion, and that if water is flocculated on the periphery of the above-mentioned inorganic fine particle, a diameter of a cluster of flocculated water molecules does not grow to the extent of causing a whitening phenomenon in the case where the above-mentioned inorganic fine particles are dispersed in a state of having a particle diameter on the order of nanometer.

The upper limit of the dispersion diameter of the above-mentioned inorganic fine particle is 500 nm. When the dispersion diameter is more than 500 nm, since the interlayer film for a laminated glass to be obtained includes too large aggregate when water molecules flocculate with the periphery of the inorganic fine particle, the haze value of the laminated glass is increased and an effect of the moisture resistance cannot be attained. A preferable upper limit is 300 nm.

Incidentally, in the present description, the disperse diameter of the inorganic fine particle refers to a longer diameter of the inorganic fine particle dispersed in the interlayer film for a laminated glass, and it refers to a longer diameter of a primary particle when the inorganic fine particles are dispersed in a state of a primary particle and it refers to a longer diameter of a secondary particle when the inorganic fine particles are dispersed in a state of a secondary particle.

The surface of the above-mentioned inorganic fine particle is preferably treated with organic matter so as to have hydrophobicity in order to improve the dispersibility in the interlayer film for a laminated glass of the present invention.

The above-mentioned organic matter is not particularly limited, but it is preferably alcohols.

The above-mentioned alcohols are not particularly limited, but they are preferably methanol and/or butanol.

The content of the above-mentioned inorganic fine particle is not particularly limited, but it preferably has a lower limit of 0.01 parts by weight and an upper limit of 50 parts by weight with respect to 100 parts by weight of the interlayer film for a laminated glass of the present invention. When this content is less than 0.01 parts by weight, since the number of the inorganic fine particles which can flocculate with a water molecule, it may be impossible to adequately inhibit whitening due to the moisture absorption, and when it is more than 50 parts by weight, the haze value of the interlayer film for a laminated glass to be obtained may be deteriorated. More preferably, a lower limit of the content is 0.1 parts by weight and an upper limit is 30 parts by weight.

The interlayer film for a laminated glass of the present invention may contain the moisture resistance improver, the heat ray shielding fine particle, and publicly known additives described above in addition to the above-mentioned constituting material.

A method of producing the interlayer film for a laminated glass of the second present invention is not particularly limited, but for example, a method, in which a transparent solution of a plasticizer formed by dispersing the above-mentioned inorganic fine particle in a liquid plasticizer is prepared once, and after an additive to be added as required is added to the solution, the mixture is added to the above-mentioned polyvinyl acetal resin, and the mixture is kneaded and molded, is suitable.

The above-mentioned liquid plasticizer is not particularly limited and publicly known liquid plasticizers which are generally used as a plasticizer for an interlayer film for a laminated glass can be used, and for example, organic type plasticizers such as monobasic organic acid ester and polybasic organic acid ester; and phosphoric acid plasticizers such as organic phosphoric acid type and organic phosphorous acid type are given. These plasticizers may be used alone or may be used in combination of two or more species.

The above-mentioned monobasic organic acid ester type plasticizer is not particularly limited and includes, for example, glycol type esters obtained by a reaction between glycol such as triethylene glycol, tetraethylene glycol or tripropylene glycol and monobasic organic acid such as butyric acid, isobutyric acid, caproic acid, 2-ethylbutyric acid, heptylic acid, n-octylic acid, 2-ethylhexylic acid, pelargonic acid (n-nonylic acid) or decylic acid. Among others, there are suitably used monobasic organic acid esters of triethylene glycol such as triethylene glycol-dicaproic acid ester, triethylene glycol-di-2-ethylbutyric acid ester, triethylene glycol-di-n-octyl acid ester and triethylene glycol-di-2-ethylhexylic acid ester. Specifically, the monobasic organic acid ester type plasticizer is preferably triethylene glycol di-2-ethylhexanoate.

The above-mentioned polybasic organic acid ester type plasticizer is not particularly limited and includes, for example, esters of polybasic organic acid such as adipic acid, sebacic acid or azelaic acid, and straight-chain or branched alcohols having 4 to 8 carbon atoms. Among others, dibutyl sebacare ester, dioctyl azelate ester, and dibutyl carbitol adipate ester are suitably used.

The above-mentioned organic phosphate type plasticizer is not particularly limited and includes, for example, tributoxyethyl phosphate, isodecylphenyl phosphate, triisopropyl phosphate and the like.

A method of dispersing the above-mentioned inorganic fine particle in the above-mentioned liquid plasticizer is not particularly limited but a method of using a bead mill is preferred. By dispersing the inorganic fine particles up to a state in which the inorganic fine particle is close to a primary particle using a dispersant, then adding a dispersion stabilizer such as carboxylic acid and stirring a mixture, a transparent solution of a plasticizer, in which a stable state of dispersion is maintained for a long time, is obtained. Further, a liquid plasticizer may contain another organic solvent for adjusting polarity. In addition, since the above-mentioned inorganic fine particle has a high moisture absorption property and a high water content, it is preferred to dry the inorganic fine particle at about 100° C. in advance.

The above-mentioned inorganic fine particles are preferably dispersed in the above-mentioned transparent solution of a plasticizer in a state in which a value of a particle size distribution index $D_{25}/D_{75}$ expressed by $D_{25}$ and $D_{75}$ is 2.0 or less.

The particle size distribution index expressed by $D_{25}$ and $D_{75}$ is a value according to JIS A 1204.

When the value of $D_{25}/D_{75}$ is more than 2.0, whitening due to the moisture absorption becomes apt to occur.

Such the transparent solution of a plasticizer also constitutes the present invention.

Since the interlayer film for a laminated glass of the present invention is constructed as described above, it has extremely excellent moisture resistance and does not cause an increase in a haze value due to moisture absorption. Particularly, if the interlayer film for a laminated glass of the present invention contains heat ray shielding particle, it also has an excellent heat ray shielding property.

A laminated glass which is obtainable by using the interlayer film for a laminated glass of the present invention also constitutes the present invention.

A Glass used for the laminated glass of the present invention are not particularly limited and a transparent glass plate commonly used can be used. As such a glass plate, there are given, for example, various inorganic glass such as float plate glass, polished plate glass, molded plate glass, meshed plate glass, wired plate glass, colored plate glass, and heat ray absorbing glass; a polycarbonate plate; organic glass plates such as a polymethyl methacrylate plate. These glasses may be used alone or in combination of two or more species.

Among others, the heat ray absorbing glass is preferably used.

The above-mentioned heat ray absorbing glass is not particularly limited, but a green glass is particularly suitable. And, if among the above-mentioned heat ray absorbing glass, a heat ray absorbing glass, which has the visible light transmittance of 75% or more and the transmittance of 65% or less in a wavelength region of 900 to 1300 nm, is used, for example, the ability of the ITO fine particle to shield infrared ray is large in the longer wavelength region than 1300 nm and relatively small in the region of 900 to 1300 nm, and therefore the heat ray absorbing glass can reduce the solar radiation transmittance for the same visible light transmittance and improve a rate of shielding solar radiation.

The above-mentioned heat ray absorbing glass may be used for both sides of a pair of glasses which sandwiched the interlayer film for a laminated glass, or may be used for only one side.

And, a transparent plastic such as polycarbonate and polymethyl methacrylate may be used in place of glass.

Thicknesses of the above-mentioned glass or the like may be appropriately selected in accordance with applications and are not particularly limited.

The laminated glass of the present invention can be fabricated by a publicly known method using the interlayer film for a laminated glass of the present invention.

The applications of the laminated glass of the present invention are not particularly limited and includes, for example, windshields, side glasses, rear glasses and roof glasses of automobiles; glass sections of vehicles such as aircrafts and electric trains, and windowpanes of buildings. Among others, the laminated glass of the present invention is particularly suitable when the side of the laminated glass is exposed as in the side windows of automobiles and the like.

When the laminated glass of the present invention is used in the application in which the side of the laminated glass is exposed, if the interlayer film for a laminated glass of the present invention is applied to only a section facing the exposed side, an adequate effect can be attained.

Schematic views showing a laminated glass having such an aspect are shown in FIG. 1 and FIG. 2. In FIG. 1 and FIG. 2, (a) is a front view of the laminated glass and (b) is a sectional view in cutting the laminated glass along a dashed line.

In the laminated glass shown in FIG. 1, the interlayer film for a laminated glass of the present invention is employed throughout the section facing the exposed side and conventional interlayer film for a laminated glass is used for another section.

In the laminated glass shown in FIG. 2, the laminated glass of the present invention has a structure in which the interlayer film for a laminated glass of the present invention is inserted in trench form in a section facing the exposed side of the conventional interlayer film for a laminated glass employed throughout the glass area.

Effect of the Invention

In accordance with the present invention, it is possible to provide the interlayer film for a laminated glass and the laminated glass, which do not cause an increase in a haze value due to moisture absorption and have excellent moisture resistance.

BEST MODE FOR CARRYING OUT THE INVENTION

Example 1

(1) Synthesis of Polyvinyl Butyral 275 parts by weight of polyvinyl alcohol having an average degree of polymerization of 1700 and a saponification degree of 99.2 mol % was added to 2890 parts by weight of pure water and the mixture was dissolved by heated. A temperature of this reaction system was adjusted to 15° C., and to this solution, 201 parts by weight of a 35% by weight hydrochloric acid and 157 parts by weight of n-butyl aldehyde were added, and a temperature of this mixture was kept at this temperature to precipitate a reactant. Then, the reaction system was kept at 60° C. for 3 hours to complete the reaction. Then, the reaction system was cleaned with excessive water to wash out unreacted n-butyl aldehyde, and the hydrochloric acid catalyst was neutralized with an aqueous solution of sodium hydroxide, a general neutralizer, and further the reaction system was washed for 2 hours with excessive water and dried to obtain a polyvinyl butyral resin in white powder form. An average butyralization degree of this resin was 68.5 mol %.

(2) Production of Interlayer Film for a Laminated Glass

To 100 parts by weight of the obtained polyvinyl butyral resin, 1.0 part by weight of poly(oxyethylene) nonylphenyl ether phosphate ester (a solubility parameter: 18.7 $(cal/cm^3)^{1/2}$) as a moisture resistance improver and 38.0 parts by weight of triethylene glycol di-2-ethylhexanoate (3GO) as a plasticizer were added, and magnesium 2-ethylbutyrate was added as an adhesion adjuster in such a way that a magnesium concentration is 0.006 parts by weight, and the mixture was adequately melted and kneaded with a mixing roller and then was extruded with an extruder to obtain an interlayer film for a laminated glass having an average film thickness of 0.76

(3) Production of Laminated Glass

The obtained interlayer film for a laminated glass was sandwiched between two transparent float glasses (30 cm long by 30 cm wide by 2.5 mm thick) from its both ends and this was put in a rubber bag and deaerated at a vacuum of 2.6 kPa for 20 minutes, and then this was moved into an oven in a state of being deaerated and subjected to vacuum press while being further retained at 90° C. for 30 minutes. A laminated glass formed preliminarily by thus attaching the float glass to each other by applying pressure was subjected to attaching by pressure under the conditions of 135° C. and a pressure of 1.2 MPa for 20 minutes in an autoclave to obtain a laminated glass.

Example 2

An interlayer film for a laminated glass was prepared and a laminated glass was prepared using the obtained interlayer film for a laminated glass by the same procedure as in Example 1 except for using polyglycerin fatty acid ester (a solubility parameter: 16.1 $(cal/cm^3)^{1/2}$) as a moisture resistance improver.

Example 3

To 100 parts by weight of the polyvinyl butyral resin obtained in Example 1, 1.0 part by weight of poly(oxyethylene)nonylphenyl ether phosphate ester (a solubility parameter: 18.7 $(cal/cm^3)^{1/2}$) as a moisture resistance improver and 1.0 part by weight of acetyl acetone, and 38.0 parts by weight of triethylene glycol di-2-ethylhexanoate (3GO) as a plasticizer were added, and magnesium 2-ethylbutyrate was added as an adhesion adjuster in such a way that a magnesium concentration is 0.006 parts by weight, and the mixture was adequately melted and kneaded with a mixing roller and then was extruded with an extruder to obtain an interlayer film for a laminated glass having an average film thickness of 0.76 mm.

A laminate glass was prepared by following the same procedure as in Example 1 except for using the obtained interlayer film for a laminated glass.

Example 4

To 100 parts by weight of the polyvinyl butyral resin obtained in Example 1, 1.0 part by weight of poly(oxyethylene)nonylphenyl ether phosphate ester (a solubility parameter: 18.7 $(cal/cm^3)^{1/2}$) as a moisture resistance improver, and 1.0 part by weight of 2-ethylhexanoic acid, and 38.0 parts by weight of triethylene glycol di-2-ethylhexanoate (3GO) as a plasticizer were added, and magnesium 2-ethylbutyrate was added as an adhesion adjuster in such a way that a magnesium concentration is 0.006 parts by weight, and the mixture was adequately melted and kneaded with a mixing roller and then was extruded with an extruder to obtain an interlayer film for a laminated glass having an average film thickness of 0.76 mm.

A laminate glass was prepared by following the same procedure as in Example 1 except for using the obtained interlayer film for a laminated glass.

Example 5

To 100 parts by weight of the polyvinyl butyral resin obtained in Example 1, 1.0 part by weight of poly(oxyethylene)nonylphenyl ether phosphate ester (a solubility parameter: 18.7 $(cal/cm^3)^{1/2}$) as a moisture resistance improver, 1.0 part by weight of acetyl acetone and 1.0 part by weight of 2-ethylhexanoic acid, and 38.0 parts by weight of triethylene glycol di-2-ethylhexanoate (3GO) as a plasticizer were added, and magnesium 2-ethylbutyrate was added as an adhesion adjuster in such a way that a magnesium concentration is 0.006 parts by weight, and the mixture was adequately melted and kneaded with a mixing roller and then was extruded with an extruder to obtain an interlayer film for a laminated glass having an average film thickness of 0.76 mm.

A laminate glass was prepared by following the same procedure as in Example 1 except for using the obtained interlayer film for a laminated glass.

Comparative Example 1

To 100 parts by weight of the polyvinyl butyral resin obtained in Example 1, 38.0 parts by weight of triethylene glycol di-2-ethylhexanoate (3GO) was added as a plasticizer, and magnesium 2-ethylbutyrate was added as an adhesion adjuster in such a way that a magnesium concentration is 0.006 parts by weight, and the mixture was adequately melted and kneaded with a mixing roller and then was extruded with an extruder to obtain an interlayer film for a laminated glass having an average film thickness of 0.76 mm.

A laminate glass was prepared by following the same procedure as in Example 1 except for using the obtained interlayer film for a laminated glass.
(Evaluation)
The interlayer films for a laminated glass and the laminated glass obtained in Examples 1 to 5 and Comparative Example 1 were evaluated according to the following method.
The results of the evaluation are shown in Table 1.
(1) Moisture Resistance Test
After each heat ray shielding laminated glass was left standing for 500 hours under the environment of 80° C. and a relative humidity 95%, a distance of a portion whitened from the end portion of the laminated glass was measured.

TABLE 1

|  | Moisture resistance test Distance of whitening (mm) |
|---|---|
| Example 1 | 2.41 |
| Example 2 | 2.33 |
| Example 3 | 2.49 |
| Example 4 | 2.20 |
| Example 5 | 2.46 |
| Comparative Example 1 | 3.77 |

Example 6

(1) Synthesis of Polyvinyl Butyral 275 parts by weight of polyvinyl alcohol having an average degree of polymerization of 1700 and a saponification degree of 99.2 mol % was added to 2890 parts by weight of pure water and the mixture was dissolved by heated. A temperature of this reaction system was adjusted to 15° C., and to this solution, 201 parts by weight of a 35% by weight hydrochloric acid and 157 parts by weight of n-butyl aldehyde were added, and a temperature of this mixture was kept at this temperature to precipitate a reactant. Then, the reaction system was kept at 60° C. for 3 hours to complete the reaction. Then, the reaction system was cleaned with excessive water to wash out unreacted n-butyl aldehyde, and the hydrochloric acid catalyst was neutralized with an aqueous solution of sodium hydroxide, a general neutralizer, and further the reaction system was washed for 2 hours with excessive water and dried to obtain a polyvinyl butyral resin in white powder form. An average butyralization degree of this resin was 68.5 mol %.

(2) Preparation of Heat Ray Absorber-Dispersed Plasticizer

Into 40 parts by weight of triethylene glycol di-2-ethylhexanoate (3GO), 0.5 parts by weight of indium tin oxide (ITO) fine particles were charged, and to this, 1.0 part by weight of poly(oxyethylene)nonylphenyl ether phosphate ester (a solubility parameter: 18.7 $(cal/cm^3)^{1/2}$) as a dispersant and a moisture resistance improver was added, and the ITO fine particles were dispersed in the plasticizer with a bead mill to prepare a heat ray absorber-dispersed plasticizer.

(3) Production of Interlayer Film for a Laminated Glass

To 100 parts by weight of the obtained polyvinyl butyral resin, 40 parts by weight of the heat ray absorber-dispersed plasticizer was added, and magnesium 2-ethylbutyrate was further added in such a way that a magnesium content is 60 ppm throughout the whole system, and the mixture was adequately melted and kneaded with a mixing roller and then was extruded with an extruder to obtain an interlayer film for a laminated glass having an average film thickness of 0.76 mm.

An average particle size of the ITO fine particles in this film was 56 nm, and particles having a particle size of 100 nm or larger were not observed.

(4) Production of Laminated Glass

The obtained interlayer film for a laminated glass was sandwiched between two transparent float glasses (30 cm long by 30 cm wide by 2.5 mm thick) from its both ends and this was put in a rubber bag and deaerated at a vacuum of 2.6 kPa for 20 minutes, and then this was moved into an oven in a state of being deaerated and subjected to vacuum press while being further retained at 90° C. for 30 minutes. A laminated glass formed preliminarily by thus attaching the float glass to each other by applying pressure was subjected to attaching by pressure under the conditions of 135° C. and a pressure of 1.2 MPa for 20 minutes in an autoclave to obtain a laminated glass.

Example 7

An interlayer film for a laminated glass was prepared and a laminated glass was prepared using the obtained interlayer film for a laminated glass by the same procedure as in Example 6 except for using polyglycerin fatty acid ester (a solubility parameter: 16.1 $(cal/cm^3)^{1/2}$) as a dispersant and a moisture resistance improver in preparation of heat ray absorber-dispersed plasticizer.

Example 8

An interlayer film for a laminated glass was prepared and a laminated glass was prepared using the obtained interlayer film for a laminated glass by the same procedure as in Example 6 except for adding 0.5 parts by weight of acetyl acetone in addition in preparation of heat ray absorber-dispersed plasticizer.

Example 9

An interlayer film for a laminated glass was prepared and a laminated glass was prepared using the obtained interlayer film for a laminated glass by the same procedure as in Example 6 except for adding 1.0 part by weight of 2-ethylhexanoic acid in addition in preparation of heat ray absorber-dispersed plasticizer.

Example 10

An interlayer film for a laminated glass was prepared and a laminated glass was prepared using the obtained interlayer film for a laminated glass by the same procedure as in Example 6 except for adding 0.5 parts by weight of acetyl acetone and 1.0 part by weight of 2-ethylhexanoic acid in addition in preparation of heat ray absorber-dispersed plasticizer.

(Evaluation)

The interlayer films for a laminated glass and the laminated glasses obtained in Examples 6 to 10 were evaluated according to the following method.

The results of the evaluation are shown in Table 2.

(1) Measurement of Visible Light Transmittance, Solar Radiation Transmittance and Haze Value The transmittance of light of 300 to 2500 nm in wavelength in the obtained laminated glass was measured using a self recording type spectrophotometer ("U 4000" manufactured by Hitachi, Ltd.), and the visible light transmittance of 380 to 780 nm in wavelength and the solar radiation transmittance of 300 to 2500 nm in wavelength were determined according to JIS R 3106. And, haze value was measured according to JIS K 6714.

(2) Moisture Resistance Test

After each laminated glass was left standing for 500 hours under the environment of 80° C. and a relative humidity 95%, a distance of a portion whitened from the end portion of the laminated glass was measured.

TABLE 2

| | Optical properties | | | Moisture resistance test |
| --- | --- | --- | --- | --- |
| | Visible light transmittance (%) | Solar radiation transmittance (%) | Haze value (%) | Distance of whitening (mm) |
| Example 6 | 83.1 | 56.2 | 0.5 | 0.63 |
| Example 7 | 83.6 | 56.7 | 0.5 | 0.58 |
| Example 8 | 82.9 | 56.0 | 0.5 | 0.65 |
| Example 9 | 83.9 | 57.1 | 0.5 | 0.60 |
| Example 10 | 84.0 | 57.4 | 0.5 | 0.71 |

Example 11

(1) Synthesis of Polyvinyl Butyral Resin 275 parts by weight of polyvinyl alcohol having an average degree of polymerization of 1700 and a saponification degree of 99.2 mol % was added to 2890 parts by weight of pure water and the mixture was dissolved by heated. A temperature of this reaction system was adjusted to 15° C., and to this solution, 201 parts by weight of a 35% by weight hydrochloric acid and 157 parts by weight of n-butyl aldehyde were added, and a temperature of this mixture was kept at this temperature to precipitate a reactant. Then, the reaction system was kept at 60° C. for 3 hours to complete the reaction. Then, the reaction system was cleaned with excessive water to wash out unreacted n-butyl aldehyde, and the hydrochloric acid catalyst was neutralized with an aqueous solution of sodium hydroxide, a general neutralizer, and further the reaction system was washed for 2 hours with excessive water and dried to obtain a polyvinyl butyral resin in white powder form. An average butyralization degree of this resin was 68.5 mol %.

(2) Preparation of Transparent Solution of Plasticizer

Into 40 parts by weight of triethylene glycol di-2-ethylhexanoate (3GO), 1.0 part by weight of silica fine particles (produced by Nippon Shokubai Co., Ltd., SEAHOSTAR KE-P10) were charged, and the silica fine particles were dispersed with a bead mill using SY-Glyster CR-ED (0.2 parts by weight) produced by Sakamoto Yakuhin Kogyo Co., Ltd. as a dispersant.

(3) Production of Interlayer Film for a Laminated Glass

To 100 parts by weight of the polyvinyl butyral resin obtained, 40 parts by weight of the transparent solution of a plasticizer was added, and magnesium 2-ethylbutyrate was further added in such a way that a magnesium content is 60 ppm throughout the whole system, and the mixture was adequately melted and kneaded with a mixing roller and then was extruded with an extruder to obtain an interlayer film for a laminated glass having an average film thickness of 0.76 mm.

An average particle size of the silica fine particles in this film was 112 nm.

(4) Production of Laminated Glass

The obtained interlayer film for a laminated glass was sandwiched between two transparent float glasses (30 cm long by 30 cm wide by 2.5 mm thick) from its both ends and this was put in a rubber bag and deaerated at a vacuum of 2.6 kPa for 20 minutes, and then this was moved into an oven in a state of being deaerated and subjected to vacuum press while being further retained at 90° C. for 30 minutes. A laminated glass formed preliminarily by thus attaching the float glass to each other by applying pressure was subjected to attaching by pressure under the conditions of 135° C. and a pressure of 1.2 MPa for 20 minutes in an autoclave to obtain a laminated glass.

Example 12

(1) Preparation of Transparent Solution of Plasticizer

Into 40 parts by weight of triethylene glycol di-2-ethylhexanoate (3GO), 1.0 part by weight of silica fine particles (produced by Nippon Shokubai Co., Ltd., SEAHOSTAR KE-P10) were charged, and the silica fine particles were dispersed with a bead mill using SY-Glyster CR-ED (0.2 parts by weight) produced by Sakamoto Yakuhin Kogyo Co., Ltd. as a dispersant. Then, 0.1 parts by weight of 2-ethylhexanoic acid was further added and the mixture was adequately stirred.

(2) Production of Interlayer Film for a Laminated Glass and Laminated Glass

To 100 parts by weight of the polyvinyl butyral resin obtained by following the same procedure as in Example 11, 40 parts by weight of the transparent solution of a plasticizer was added, and magnesium 2-ethylbutyrate was further added in such a way that a magnesium content is 60 ppm throughout the whole system, and the mixture was adequately melted and kneaded with a mixing roller and then was extruded with an extruder to obtain an interlayer film for a laminated glass having an average film thickness of 0.76 mm.

An average particle size of the silica fine particles in this film was 107 nm.

Subsequently, a laminated glass was produced by following the same procedure as in Example 11.
(Evaluation)
The interlayer films for a laminated glass and the laminated glass obtained in Examples 11 to 12 were evaluated according to the following method.

The results of the evaluation are shown in Table 3.
(1) Measurement of Visible Light Transmittance and Haze Value The transmittance of light of 300 to 2500 nm in wavelength in the obtained laminated glass was measured using a self recording type spectrophotometer ("U 4000" manufactured by Hitachi, Ltd.), and the visible light transmittance of 380 to 780 nm in wavelength and the solar radiation transmittance of 300 to 2500 nm in wavelength were determined according to JIS R 3106.
(2) Moisture Resistance Test
After each laminated glass was left standing for 500 hours under the environment of 80° C. and a relative humidity 95%, a distance of a portion whitened from the end portion of the laminated glass was measured.

TABLE 3

|  | Optical properties | | Moisture resistance test |
| --- | --- | --- | --- |
|  | Visible light transmittance (%) | Haze value (%) | Distance of whitening (mm) |
| Example 11 | 85.5 | 0.5 | 0.57 |
| Example 12 | 86.7 | 0.5 | 0.51 |

Example 13

(1) Synthesis of Polyvinyl Butyral Resin 275 parts by weight of polyvinyl alcohol having an average degree of polymerization of 1700 and a saponification degree of 99.2 mol % was added to 2890 parts by weight of pure water and the mixture was dissolved by heated. A temperature of this reaction system was adjusted to 15° C., and to this solution, 201 parts by weight of a 35% by weight hydrochloric acid and 157 parts by weight of n-butyl aldehyde were added, and a temperature of this mixture was kept at this temperature to precipitate a reactant. Then, the reaction system was kept at 60° C. for 3 hours to complete the reaction. Then, the reaction system was cleaned with excessive water to wash out unreacted n-butyl aldehyde, and the hydrochloric acid catalyst was neutralized with an aqueous solution of sodium hydroxide, a general neutralizer, and further the reaction system was washed for 2 hours with excessive water and dried to obtain a polyvinyl butyral resin in white powder form. An average butyralization degree of this resin was 68.5 mol %.

(2) Preparation of Transparent Solution of Plasticizer

A transparent solution of a plasticizer containing silica fine particles was prepared by weighing 0.5 parts by weight of silica fine particles (produced by Nippon Shokubai Co., Ltd., SEAHOSTAR KE-P10) with methanol and buthanol and mixing this silica fine particles in 38.5 parts by weight of triethylene glycol di-2-ethylhexanoate which is a liquid plasticizer for 10 minutes using a stirrer (Three-One Motor BL1200).

(3) Production of Interlayer Film for a Laminated Glass and Laminated Glass

The obtained transparent solution of a plasticizer and the obtained polyvinyl butyral resin were mixed, and the mixture was adequately melted and kneaded with a mixing roller and then was formed at 150° C. for 30 minutes using a press machine to obtain an interlayer film for a laminated glass having an average film thickness of 0.76 mm.

Further, the obtained interlayer film for a laminated glass was sandwiched between two transparent float glasses (30 cm long by 30 cm wide by 2.5 mm thick) from its both ends and this was put in a rubber bag and deaerated at a vacuum of 2.6 kPa for 20 minutes, and then this was moved into an oven in a state of being deaerated and subjected to vacuum press while being further retained at 90° C. for 30 minutes. A laminated glass formed preliminarily by thus attaching the float glass to each other by applying pressure was subjected to attaching by pressure under the conditions of 135° C. and a pressure of 1.2 MPa for 20 minutes in an autoclave to obtain a laminated glass.

Example 14

A transparent solution of a plasticizer was prepared by following the same procedure as in Example 13 except for using 0.5 parts by weight of silica fine particles (produced by ADMATECHS Co., Ltd., SO-E1) and further adding 0.06 parts by weight of a polyglycerin ester dispersant (produced by Sakamoto Yakuhin Kogyo Co., Ltd., SY-Glyster CR-ED) as a dispersant.

Subsequently, an interlayer film for a laminated glass and a laminated glass were produced by following the same procedure as in Example 13.

Example 15

A transparent solution of a plasticizer was prepared by following the same procedure as in Example 14 except for using aluminum oxide fine particles (produced by ADMATECHS Co., Ltd., AO-802) in place of silica fine particles.

Subsequently, an interlayer film for a laminated glass and a laminated glass were produced by following the same procedure as in Example 13.

Comparative Example 2

A triethylene glycol di-2-ethylhexanoate liquid plasticizer was prepared as a reference solution not containing inorganic fine particles.

Subsequently, an interlayer film for a laminated glass and a laminated glass were produced by following the same procedure as in Example 13.

(Evaluation)

The solutions, the interlayer films for a laminated glass and the laminated glass obtained in Examples 13 to 15 and Comparative Example 2 were evaluated according to the following method.

The results of the evaluation are shown in Table 4.

(1) Measurement of Particle Size Distribution Index of Solution

A value of a particle size distribution index $D_{25}/D_{75}$ expressed by $D_{25}$ and $D_{75}$ was determined on each solution following a method according to JIS A 1204.

(2) Measurement of Visible Light Transmittance of Solution

The transmittance of light of 300 to 2500 nm in wavelength in the obtained solution was measured using a self recording type spectrophotometer ("U 4000" manufactured by Hitachi, Ltd.), and the visible light transmittance of 380 to 780 nm in wavelength was determined according to JIS Z 8722 and JIS R 3106.

(3) Measurement of Haze Value of Solution

A haze value was measured on a solution according to JIS K 6714 using a self recording type spectrophotometer ("U 4000" manufactured by Hitachi, Ltd.).

(4) Measurement of Particle Size of Inorganic Fine Particles in Interlayer Film for a Laminated Glass A state of dispersion of the inorganic fine particles in the interlayer film for a laminated glass was taken photographs of and observed under the following measuring conditions with the following transmission electron microscope (TEM). In addition, an area of 3 μm×4 μm was taken photographs of at a magnification of 20,000 times and this photograph was enlarged to 3 times in a printing stage.

With respect to the particle diameter of the inorganic fine particle, the longest diameter of the fine particles in the photograph obtained by the above-mentioned taking of photographs was employed. And, particle diameters of all particles in the above-mentioned photo scope of 3 μm×4 μm were measured and an average particle diameter was derived by volumetrically averaging.

Observing apparatus: transmission electron microscope H-7100 FA manufactured by Hitachi, Ltd.

Acceleration voltage: 100 kV

Sectioning & Specimen Preparation apparatus: Ultramicrotome EM-ULTRACUT•S manufactured by Leica Microsystems AG: FC-S type cryosectioning system REICHERT-NISSEI-FCS manufactured by Leica Microsystems AG Knife: DIATOME ULTRA CRYO DRY manufactured by DIATOME Ltd.

(5) Measurement of Visible Light Transmittance of Laminated Glass

The transmittance of light of 300 to 2500 nm in wavelength in the obtained laminated glass was measured using a self recording type spectrophotometer ("U 4000" manufactured by Hitachi, Ltd.), and the visible light transmittance of 380 to 780 nm in wavelength was measured according to JIS R 3106.

(6) Moisture Resistance Test of Laminated Glass

The laminated glass was left standing for one month in an atmosphere of a relative humidity 95% according to JIS R 3212 (1998), and then a distance of a portion whitened (distance of whitening) was measured from the periphery of the laminated glass.

TABLE 4

| | | | Example | | | Comparative Example |
|---|---|---|---|---|---|---|
| | | | 13 | 14 | 15 | 2 |
| Composition | | Inorganic fine particle | Silice fine partticle (KE-P10) | Silice fine particle (SO-E1) | Aluminum oxide fine particle (AO-802) | — |
| | | | 0.5 parts by weight | 0.5 parts by weight | 0.5 parts by weight | — |
| | | Dispersant (additive) | — | polyglycerin ester dispersant | Polyglycerin ester dispersant | — |
| | | | — | 0.06 parts by weight | 0.06 parts by weight | — |
| | | Plasticizer (solvent) | Triethylene glycol di-2-ethylhexanoate | Triethylene glycol di-2-ethylhexanoate | Triethylene glycol di-2-ethylhexanoate | Triethylene glycol di-2-ethylhexanoate |
| | | | 38.5 parts by weight | 38.5 parts by weight | 38.5 parts by weight | — |
| Evaluation | Solution | Dispersion diameter (nm) | 38 | 87 | 95 | — |
| | | $D_{26}/D_{76}$ | 2.0 or less | 2.0 or less | 2.0 or less | — |
| | Refractive index | Inorganic fine particle | 1.4 | 1.4 | 1.4 | — |
| | | Solvent | 1.4 | 1.4 | 1.4 | 1.4 |
| | | Difference between refractive indexes | 0 | 0 | 0 | — |
| | | Visible light transmittance (%) | 98 | 98 | 98 | 98 |
| | | Haze value | 0.1 | 0.1 | 0.1 | 0.1 |

TABLE 4-continued

| | | Example | | | Comparative Example |
| --- | --- | --- | --- | --- | --- |
| | | 13 | 14 | 15 | 2 |
| Interlayer film | Average particle diameter of inorganic fine particles (nm) | 38 | 87 | 95 | — |
| | Visible light transmittance (%) | 87.7 | 87.6 | 87.7 | 87.7 |
| Moisture resistance test | Distance of whitening (mm) | 0.57 | 0.51 | 0.63 | 3.77 |

INDUSTRIAL APPLICABILITY

According to the present invention, there can be provided an interlayer film for a laminated glass and a laminated glass, which do not cause an increase in a haze value due to moisture absorption and have excellent moisture resistance.

DESCRIPTION OF THE NUMERALS

Figure 1:
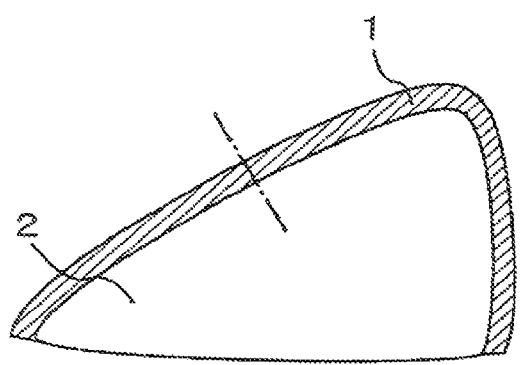
FIG. 1 is a schematic view showing an embodiment of a laminated glass of the present invention.
Figure 1:
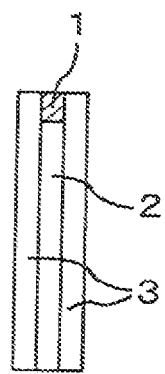
Figure 2:
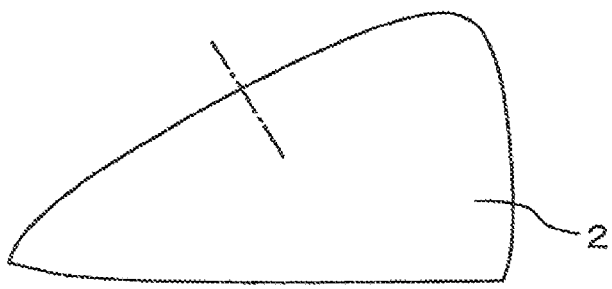
FIG. 2 is a schematic view showing another embodiment of a laminated glass of the present invention.
Figure 2:
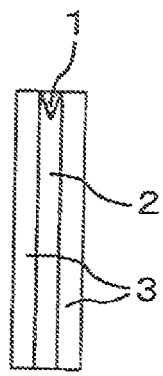

1 Interlayer film for a laminated glass of the present invention
2 Conventional interlayer film for a laminated glass
3 Glass

The invention claimed is:

1. An interlayer film for a laminated glass, which contains a polyvinyl acetal resin and as a moisture resistance improver, a moisture resistance improver effective amount of a phosphate ester compound and wherein a laminated glass, produced by interposing the interlayer film between two sheets of glass, has a distance of whitening of 2.49 mm or less after the laminated glass is left standing for 500 hours under an environment of 80° C. and a relative humidity of 95%.

2. The interlayer film for a laminated glass according to claim 1, wherein the moisture resistance improver is an amphiphile and/or a surfactant.

3. The interlayer film for a laminated glass according to claim 1, wherein the moisture resistance improver has a solubility parameter in the range of 10.0 to 20.0 $(cal/cm^3)^{1/2}$.

4. The interlayer film for a laminated glass according to claim 1, wherein the moisture resistance improver has a relative permittivity in the range of 20 to 35 at 25° C.

5. The interlayer film for a laminated glass according to claim 1, which contains a chelating agent and/or a compound having at least one carboxyl group.

6. The interlayer film for a laminated glass according to claim 5, wherein the chelating agent is acetylacetone.

7. The interlayer film for a laminated glass according to claim 5, wherein the compound having at least one carboxyl group is 2-ethyl hexanoic acid.

8. The interlayer film for a laminated glass according to claim 1, which contains a heat ray shielding particle.

9. The interlayer film for a laminated glass according to claim 8, wherein the heat ray shielding particle is at least one kind selected from the group consisting of a tin-doped indium oxide (ITO) fine particle, an antimony-doped tin oxide (ATO) fine particle, an aluminum-doped zinc oxide (AZO) fine particle, an indium-doped zinc oxide (IZO) fine particle, a silicon-doped zinc oxide fine particle, a zinc antimonic anhydride fine particle, and a lanthanum hexaboride fine particle.

10. The interlayer film for a laminated glass according to claim 1, wherein the amount of the phosphate ester compound is 0.005 parts by weight to 20 parts by weight per 100 parts by weight of the polyvinyl acetal resin.

11. The interlayer film for a laminated glass according to claim 1, wherein the amount of the phosphate ester compound is 0.01 parts by weight to 5 parts by weight per 100 parts by weight of the polyvinyl acetal resin.

12. A laminated glass, which is obtained by using the interlayer film for a laminated glass according to claim 1.

13. A laminated glass, which is obtained by using the interlayer film for a laminated glass according to claim 2.

14. A laminated glass, which is obtained by using the interlayer film for a laminated glass according to claim 3.

15. A laminated glass, which is obtained by using the interlayer film for a laminated glass according to claim 4.

16. A laminated glass, which is obtained by using the interlayer film for a laminated glass according to claim 5.

17. A laminated glass, which is obtained by using the interlayer film for a laminated glass according to claim 6.

18. A laminated glass, which is obtained by using the interlayer film for a laminated glass according to claim 7.

19. A laminated glass, which is obtained by using the interlayer film for a laminated glass according to claim 8.

20. A laminated glass, which is obtained by using the interlayer film for a laminated glass according to claim 9.

* * * * *